United States Patent Office 3,364,880
Patented Jan. 23, 1968

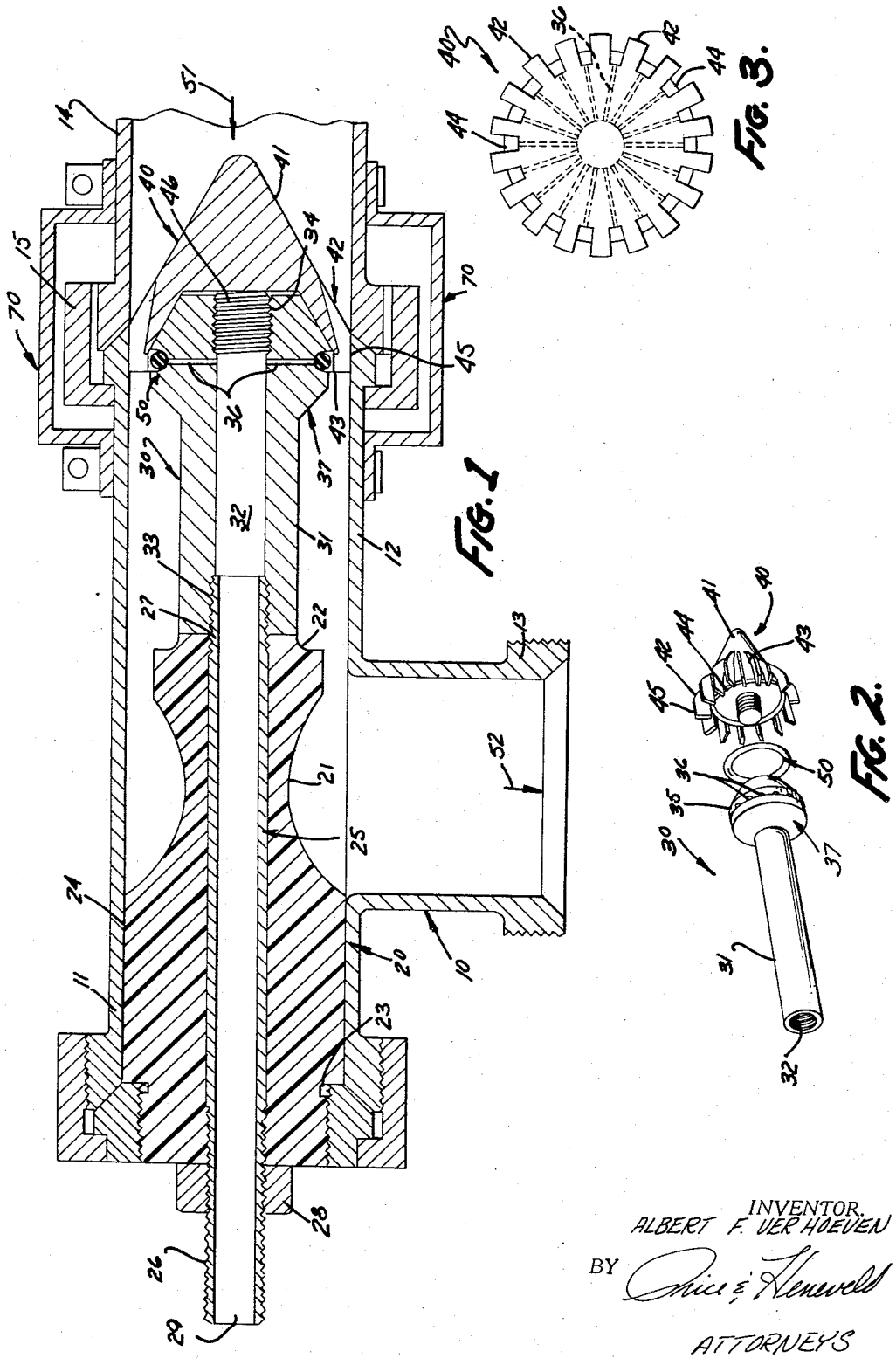

3,364,880
PRE-MIX AIRO-MIXER
Albert F. Ver Hoeven, Grand Rapids, Mich., assignor to Werner Machinery Co., Grand Rapids, Mich., a corporation of Michigan
Filed May 12, 1966, Ser. No. 549,647
7 Claims. (Cl. 107—31)

This invention relates to airo-mixers and, more particularly, to a unique type of air nozzle for introducing metered air into baking batter prior to its being fed into the primary air mixers found in modern commercial baking concerns.

In the commercial baking art it has been customary for some time to artificially introduce air into batter prior to baking it as an aid to obtaining a uniform texture in the finished baked goods. This introduction of air usually involves two distinct steps. Initially, the batter is subjected to escaping compressed air in a pre-mix assembly. This subjection causes the batter to take on bubbles of air so that when the goods are baked their texture will be such as to render them more readily marketable. After the batter has passed through the pre-mixer it is channeled into the main mixer which completes the mixing process. This invention relates to the type of apparatus which is utilized initially to entrap the compressed air within the batter prior to its introduction into the main mixer.

Air nozzles suitable for utilization in pre-mixers of the type described have generally consisted of an elongated tube having a plurality of outlet apertures in the periphery thereof. A rubber sleeve is placed over the tube and compressed air is channeled to the inside of it. The assembly is placed within some type of surrounding conduit and the batter run thereof. The compressed air selectivity raises the rubber sleeve and escapes into the batter.

While nozzles of this type have been widely accepted in the art they have not been entirely satisfactory. This is because there is no manner in which the air to be introduced into a given amount of batter may be effectively distributed therethrough in a uniform fashion. That is to say, that certain samples of the batter nearly always contain more air than other samples after passage through this type of the pre-mixer nozzle. This, of course, leads to non-uniformity in finished products and, more importantly, to an unevenness in texture which renders the finished baked goods less acceptable to consumers.

Another problem whch has existed in prior art pre-mix nozzles is that there is no means whereby the size of the air bubbles within the batter, and thus the resulting density of any particular segment thereof, may be controlled. This is because the rubber sleeve mentioned previously does not effectively meter the air escaping from the supply tube in such a manner that uniform discrete quantities thereof will be introduced into the batter at predetermined intervals.

It is an object of this invention to provide a pre-mix air nozzle which is not subject to the above outlined disadvantages.

More particularly, it is an object of this invention to provide an air nozzle wherein the metered air is introduced into discrete channelar segments of the batter, thus assuring more uniform distribution of the air bubbles within the batter.

It is an object of this invention to provide an air nozzle of the type described wherein the size of the air bubbles, and thus the density of any particular sample of the batter, may be effectively controlled.

It is still another object of this invention to provide an apparatus of the type described wherein the batter may be precooled during its passage through the air nozzle.

These and other objects of this invention will be understood clearly by reference to the following specification and accompanying figures in which:

FIG. 1 is a cross-sectional view of the pre-mixer assembly taken along a plane which passes longitudinally symmetrically therethrough;

FIG. 2 is an exploded view of the nozzle stem and head; and

FIG. 3 is a front-elevational view of the nozzle stem and head.

Briefly, this invention comprises a pre-mix air nozzle including an enclosure having a batter inlet section and a batter outlet section. Positioned within the enclosure and dividing the batter inlet section from the batter outlet section is a head having a plurality of fins extending radially therefrom. Sections of the radial extremities of these fins abut the enclosure so as to form a plurality of discrete channels through which batter may flow from the inlet section into the outlet section. Means are provided for introducing metered air into the batter during the time that it is passing between the inlet and outlet sections and, thus during the time that it is divided into a plurality of discrete channelar streams by the radially extending fins.

The means for introducing air into the channelar streams of batter include a stem section having an air supply throat drilled through the center thereof. The stem section mates with the head in such a manner that a section of its periphery lies beneath the radially extending fins and thus, beneath the batter channels. The stem section is provided with a peripheral recess around that section of its body lying adjacent the batter channels. A plurality of radial air conduits are provided between the base of the peripheral recess and the air supply throat within the stem. A rubber O-ring encircles the stem within the peripheral recess. This ring, in addition to acting as a check valve for preventing batter from flowing into the stem and plugging it, also serves to meter the air before it enters the channelar-like streams of batter flowing past the periphery of the head.

Referring now to the figures, a preferred embodiment of this invention will be described in detail. Conveniently, the enclosure may take the form of a T-shaped housing 10, the various legs of which may be designated as an air intake leg 11, a batter intake leg 12 and a batter outlet leg 13. Thus, as viewed in FIG. 1, the batter to be aerated enters at the right hand side of the T-shaped connection 10, flows to the middle thereof, and escapes in a downward direction via leg 13. The T-shaped enclosure is provided with conventional coupling means at its various extremities.

Positioned within enclosure 10 and abutting the air intake section 11 thereof is a flow control sleeve 20 which may conveniently be fabricated from nylon or stainless steel. Flow control sleeve 20 has a recessed section 21 positioned above outlet 13, a forward shoulder 22 and a rearward shoulder 23. The rearward shoulder 23 seals the air intake section of the enclosure in a conventional manner such that cylindrical section 24 abuts the cylindrical tubing of the T-shaped enclosure at all points around its periphery.

An air supply tube 25 having threaded ends 26 and 27 passes through the longitudinal center of the flow control sleeve 20 in the manner indicated in FIG. 1. Conveniently, flow control sleeve 20 may be retained in position by a nut 28 threaded around air supply tube 25. Metered air is provided for the assembly at intake aperture 29.

Abutting flow control sleeve 20 is a stem 30 having a cylindrical section 31 through which passes an air supply throat 32. Stem 30 is tapped at each of its extremities. The rearward section engages the threaded extremity of air supply tube 25 and thus positively positions flow control sleeve 20. Stem 30 has an enlarged section 37 at one end thereof which may conveniently be shaped in the manner indicated in FIG. 1. A perpiheral recess 35 encircles the enlarged section 37 of stem 30 and a plurality of radial air conduits 36 extend from the base thereof into air supply throat 32.

The mixer head 40 consists of a conical body 41 having a plurality of fins 42 extending radially therefrom. The rearward section 43 of fins 42 extend over the peripheral recess 35 in sleeve 30 in the manner shown in FIG. 1. Sections 45 of the fins 42 abut the sides of enclosure 10 such that a plurality of discrete mixing channels 44 are formed between the fins. Head 40 may conveniently be affixed to the nozzle assembly by means of a threaded nipple 46 which engages tapped aperture 34 in sleeve 30.

As viewed best in FIG. 1, the head 40 mates with sleeve 30 in such a manner that the rearward section 45 of fins 42 extends around but is radially spaced from peripheral recess 35. A conventional O-ring is passed around peripheral recess 35. The spacing between the base of recess 35 and section 43 of fin 42, and the diameter of O-ring 50, are related that O-ring 50 may expand within the circular chamber in response to air flowing through radial conduits 36, thus allowing the air to escape into the batter channels 44. Edge 43 of fin 42 prevents the O-ring from being blown out of peripheral recess 35.

Operation

In operation, the batter to be aerated enters the nozzle enclosure section 14 in the direction indicated by arrow 51. As the batter contacts the point of conical body 41 on mixer head 40 it begins to expand in conformity therewith. When the batter reaches fins 42, it is divided into a plurality of discrete streams. Each of these discrete streams flows from the intake section 14 into the outlet section 13 of the enclosure.

Metered air is introduced into the mixer at inlet 29. This air flows through air supply tube 25 and air supply throat 32 into radial conduits 36. One conduit 36 is provided for each channel 44. As the air within conduits 36 reaches a specified pressure which is predetermined by the elasticity of O-ring 50, the O-ring radially expands thus allowing metered air to flow into each of the streams of batter flowing through channels 44. After the batter exits from channels 44 into the outlet section 13 of enclosure 10, it recombines into one continuous stream passing along sleeve 30 and changing direction within recess 21 so that it may flow out of outlet 13 as indicated by arrow 52.

When the batter flow has been terminated, the air supply through air tube 25 is cut off. As the pressure at radial conduits 36 decreases, O-ring 50 retracts. This seals conduits 36 such that any remaining batter cannot flow thereinto and harden and such that no more air will be allowed to escape into channels 44.

The intake tube 14 may be affixed to the housing 10 by any well-known coupling means such as is indicated at 15. Similarly, couplings may be made to outlet section 13 such that the pre-aerated batter flows directly from enclosure 10 into the main air mixer.

It is often desirable to pre-cool the batter during the time that it is being subjected to the aerating stream. This may be easily accomplished by adding a cooling jacket 70 around the housing 10 adjacent the mixer head 40 as indicated in FIG. 1. Cooling jacket 70 is circular so as to conform to the peripheral shape of housing 10 and intake tube 14. Cooling fluid may be pumped into and out of the jacket in a well-known manner. Conveniently, the same coolant which is utilized to cool the main air mixer may be utilized to cool the pre-mixer, thus eliminating the necessity of providing a separate source of coolant.

Thus, it will be seen that this invention has provided a pre-mixer which effectively controls the density and uniformity of the baking batter passed therethrough by a process of dividing it into discrete streams and supplying the air to each such stream. The apparatus is relatively simple and inexpensive in nature, and yet, performs in an extremely satisfactory manner.

While a preferred embodiment of this invention has been described in detail, it will be obvious to those skilled in the art that a number of modifications thereof may be executed without departing from the spirit and scope of this disclosure. Such modifications are to be considered as included in the following claims unless these claims, by their language, expressly state otherwise.

I claim:
1. A pre-mix air nozzle for introducing metered air into baking batter, said nozzle comprising:
   an enclosure having a batter inlet section and a batter outlet section;
   a head positioned within said enclosure between said inlet and outlet sections, said head having a plurality of channels therein wherethrough batter may flow from said inlet section to said outlet section; and
   means for introducing air into said batter as it passes through said channels.

2. The combination as set forth in claim 1 wherein that section of the enclosure surrounding said head is circular in cross-section and wherein said head comprises a circular member having a plurality of fins extending radially therefrom, the radial extremities of said fins abutting said enclosure whereby the space between adjacent fins form said channels.

3. The combination as set forth in claim 2 wherein said member has a cone shaped portion extending into said inlet section, whereby the turbulence of the batter flowing between said sections is minimized.

4. The combination as set forth in claim 2 in which said means for introducing air comprises:
   a generally circular hollow stem having a peripheral recess in one extremity thereof, said stem and said head adapted to abut in such a manner that said peripheral recess lies beneath but radially spaced from said fins; and
   a plurality of air carrying conduits communicating between the inside of said hollow stem and said peripheral recess.

5. The combination as set forth in claim 4 which further comprises a resilient O-ring positioned around said peripheral recess adapted to radially expand when compressed air is introduced into said conduits but adapted to contract and seal said conduits when no compressed air is present therein, said fins extending over said recess a sufficient distance to check the radial expansion of said O-ring.

6. A nozzle for introducing air into baking batter, said nozzle comprising:
   an enclosure having a batter inlet section and a batter outlet section;
   means positioned within said enclosure for dividing the batter flowing from said inlet section toward said outlet section into a plurality of discrete streams; and
   means for introducing air into each of said discrete streams.

7. The combination as set forth in claim 6 which further comprises valve means for preventing batter from flowing into said introducing means when the air supply to said introducing means has been terminated.

References Cited

UNITED STATES PATENTS

| | | | |
|---|---|---|---|
| 1,496,345 | 6/1924 | Lichtenthaeler | 259—4 |
| 1,519,462 | 12/1924 | Loker | 239—430 |
| 2,252,076 | 8/1941 | Juterbock | 259—4 |
| 3,282,513 | 11/1966 | Savage | 239—534 |

FOREIGN PATENTS

| | | |
|---|---|---|
| 1,271,380 | 7/1961 | France. |

WILLIAM I. PRICE, *Primary Examiner.*